(12) United States Patent
Meyer (10) Patent No.: US 7,310,464 B2
(45) Date of Patent: Dec. 18, 2007

(54) MULTI-WAVELENGTH OPTICAL SOURCE (75) Inventor: A. Douglas Meyer, Woodland Hills, CA (US)

(73) Assignee: Litton Systems, Inc., Los Angeles, CA (US)

( * ) Notice: Subject to any disclaimer, the term of this patent is extended or adjusted under 35 U.S.C. 154(b) by 0 days.

(21) Appl. No.: 11/157,504

(22) Filed: Jun. 21, 2005

(65) Prior Publication Data
US 2006/0285794 A1 Dec. 21, 2006

(51) Int. Cl.
*G02B 6/34* (2006.01)
(52) U.S. Cl. ...................................... 385/37
(58) Field of Classification Search ............ 385/16–24, 385/31–37, 42–46; 372/6, 25; 359/263, 359/247, 566–576; 398/1, 72; 250/227.14, 250/226
See application file for complete search history.

(56) References Cited

U.S. PATENT DOCUMENTS

| | | | | |
|---|---|---|---|---|
| 4,942,294 A | * | 7/1990 | Witte | 250/227.14 |
| 5,557,442 A | | 9/1996 | Huber | 359/333 |
| 6,330,384 B1 | | 12/2001 | Ryu et al. | 385/39 |
| 6,365,891 B1 | | 4/2002 | Hodgson et al. | 250/227.14 |
| 6,490,045 B1 | * | 12/2002 | Dakin et al. | 356/483 |
| 6,507,679 B1 | | 1/2003 | Hodgson et al. | 385/12 |

FOREIGN PATENT DOCUMENTS

| | | | |
|---|---|---|---|
| EP | 0523484 | | 1/1993 |
| EP | 0744797 | | 11/1996 |
| EP | 1024541 | | 8/2000 |
| EP | 1411657 | | 4/2004 |
| JP | 2000019335 A | * | 1/2000 |
| WO | 02/084905 | | 10/2002 |

OTHER PUBLICATIONS

English-language translation of JP 2000019335 A, printed Mar. 6, 2007.*

* cited by examiner

*Primary Examiner*—Quyen P Leung (57) ABSTRACT

A multi-wavelength optical source includes a broadband optical source providing a broadband optical signal, and a modification module optically coupled to the broadband optical source. The modification module splits the broadband optical signal into a first output signal and a second output signal. The first output signal and second output signal each comprise a plurality of frequency separated frequency slices of the broadband optical signal. Also, a method of providing a pair of related multi-wavelength signals using one or more broadband sources includes: (a) routing a broadband signal into a plurality of Bragg gratings in a manner that causes the Bragg gratings to reflect portions of the broadband signal and to transmit portions of the broadband signal; (b) routing the reflected portions to a first output as a first output signal; and (c) routing the non-reflected portions to a second output as a second output signal.

12 Claims, 5 Drawing Sheets

701 routing a broadband signal into a plurality of Bragg gratings in a maner that causes the Bragg gratings to reflect portions of the broadband signal and to transmit portions of the broadband signal

703 routing the reflected portions to a first output as a first output signal

705 routing the non-reflected portions to a second output as a second output signal

FIG.14

MULTI-WAVELENGTH OPTICAL SOURCE

FIELD OF THE INVENTION

The present invention relates generally to devices and methods for producing multi-wavelength optical signals.

BACKGROUND OF THE INVENTION

Optical sources are used in a variety of optical sensing applications. Although the number of sensing applications they are used in prevents listing them all herein, one application of optical sources is acoustic sensing using towed, fixed and hull mounted arrays. Another application is terrestrial based systems for the detection of ground borne sources of vibration and motion in particular those associated with oil and gas exploration. Still other applications are the use of sensors in pipelines and the monitoring of secure facilities.

Previously known optical sources used in optical fiber sensing are typically either high coherence single wavelength devices or low coherence broadband devices. The selection of an optical source for a particular application depends on the type of optical sensor used, as well as the system noise and detection requirements specific to the application.

Systems utilizing optical sources will generally include other optical devices as well. Such devices include, but are not limited to, fiber Bragg gratings, optical circulators, pump lasers, doped fibers, doped waveguides, amplified spontaneous emission sources, super luminescent diodes, and optical isolators. A fiber Bragg grating (FBG) is a periodic or aperiodic perturbation of the index of refraction in the core of an optical waveguide. The period of the index perturbation determines the wavelength or wavelength band the grating will affect. Depending on the depth of the index perturbation the FBG is capable of reflecting all or a portion of the desired optical wavelength while allowing other wavelengths to pass through unaffected. An optical circulator is typically a three port device that is capable of rotating the inputs and outputs of the device in a cyclic manner. That is, a signal input on port 1 will exit the device on port 2, a signal input on port 2 will exit on port 3, and signals are prevented from passing from the first port to the third port, and from the second port to the first port. The input output relation can be expressed as 1->2->3->1. A pump laser is a laser or optical source used as an optical stimulating source to cause a laser transition to occur in an optical waveguide (fiber, crystal, polymer, etc) that is doped with ions that can lase. A doped fiber or waveguide is an optical fiber or optical waveguide that is doped with ions that can lase when stimulated with an optical signal of the appropriate wavelength to cause a laser transition to occur in the dopant material. An amplified spontaneous emission (ASE) source is an optical source with a broadband emission spectrum caused by the free run condition of a doped optical fiber (or waveguide) stimulated by the appropriate optical wavelength allowing super fluorescents to occur. A super luminescent diode (SLD) is a light emitting diode (LED) that has been designed to work with high current injection levels causing a spontaneous emission in a gain medium. It is typically similar in structure to laser diodes with the exception of having modified facets to eliminate or minimize a resonant (oscillation) condition. An optical isolator is a non-reciprocal optical element whose propagation properties change when the normal input and output are interchanged. An optical isolator allows the flow of optical signal in one direction only.

SUMMARY OF THE INVENTION

The present invention is directed to a multi-wavelength optical source (MWO) that utilizes a wideband internal optical source to provide two outputs, one providing a signal comprising a plurality of frequency slices from the signal output from the internal optical source, and a second comprising the remaining signal output from the internal optical source after the frequency slices have been removed. In some instances the output signals will be amplified and/or supplemented prior to reaching the output ports.

An exemplary embodiment of the invention is a multi-wavelength optical source that includes a broadband optical source providing a broadband optical signal, and a modification module optically coupled to the broadband optical source. The modification module splits the broadband optical signal into a first output signal and a second output signal. The first output signal and second output signal each comprise a plurality of frequency separated frequency slices of the broadband optical signal.

Another exemplary embodiment of the invention is a method of providing a pair of related multi-wavelength signals using one or more broadband sources. The method includes: (a) routing a broadband signal into a plurality of Bragg gratings in a manner that causes the Bragg gratings to reflect portions of the broadband signal and to transmit portions of the broadband signal; (b) routing the reflected portions to a first output as a first output signal; and (c) routing the non-reflected portions to a second output as a second output signal.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Reference will now be made to the preferred embodiments of the invention, examples of which are illustrated in the accompanying drawings. While the invention will be described in conjunction with the preferred embodiments, it will be understood that these embodiments are not intended to limit the invention. On the contrary, the invention is intended to cover alternatives, modifications and equivalents, which may be included within the spirit and scope of the invention as defined by the appended claims.

In the following detailed description, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail so as not to unnecessarily obscure the important aspects of the present invention.

Figure 1:
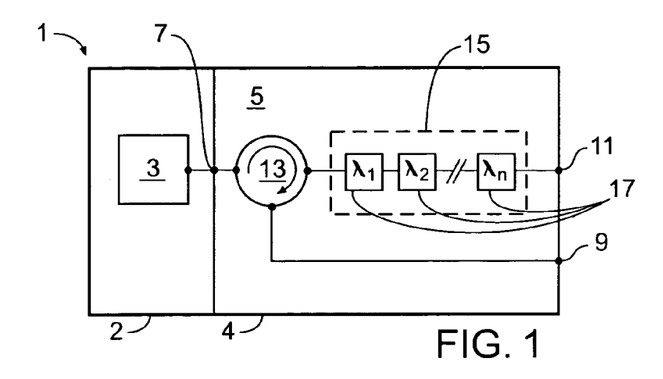
FIG. 1 is a schematic view of a first multi-wavelength optical source in accordance with an exemplary embodiment of the invention.

In FIG. 1, an exemplary multi-wavelength optical source (MWO) 1 includes a broadband optical source 3 in a housing 2, and a modification module 5 in a housing 4, where the housing 4 of modification module 5 includes an input port 7, a first output port 9, a second output port 11, a circulator 13, and a set 15 of n Bragg gratings 17. The broadband optical source 3 is optically coupled to the modification module 5 such that the source 3 provides a broadband optical signal to the modification module 5 via the input port 7.

The circulator 13 ensures that the broadband optical signal entering the module 5 through the input port 7 is directed to the set 15 of n Bragg gratings 17, that any portions of that signal reflected by the Bragg grating exit the module via the first output port 9, and that any non-reflected portions of that signal exit the module 5, and the source 1, via the second output port 11. As such, the modification module 5 splits the broadband optical signal (see FIG. 2) from the source 3 into a first output signal (see FIG. 3) and a second output signal (see FIG. 4). As will be discussed further, the first output signal and second output signal each comprise a plurality of frequency separated frequency slices of the broadband optical signal provided by the source 3. The frequency slices are frequency separated in that, for each pair of slices, substantially all of at least one component frequency of the broadband optical frequency that previously fell between the slices has been removed in forming the slices.

The optical source 3 may be any broadband optical source. However, it is contemplated that in some instances the source 3 may be a super luminescent diode (SLD), or an optical fiber based amplified spontaneous emission (ASE) source.

If an SLD, the source 3 may in some instances: (a) have an optical bandwidth of 30 to 60 nanometers at full width half maximum (FWHM); (b) have a wavelength spectral distribution that is described as lambertian or gaussian in shape; (c) have a wavelength centroid near 800, 1300, or 1550 nanometers; and/or (d) have an output power around 10-100 milliwatts. For the MWO 1, a preferred broadband SLD source will be centered near 1550 nm for compatibility with other optical components, and has the highest output power for the particular wavelength band of interest so as to maximize the output power in the partitioned wavelengths. While is it not a requisite, a thermal electric cooler (TEC) can be used in conjunction with, or as part of, the SLD source 3 so as to: (a) eliminate or minimize thermally induced wavelength drift; (b) allow for a broader environmental operating temperature range of the SLD; and (c) increase the operational lifetime of the SLD.

If an ASE, the source 3 will typically be made from a length of doped optical fiber that is pumped by a pumping wavelength causing the doped fiber to generate a broadband fluorescence in a free run condition. The wavelength of ASE or fluorescent emission is a function of the dopant ions used. Erbium ($ER^{+3}$) is one of the better known dopants producing an ASE spectrum in the 1550 nm window, and is much recognized due to its use in the optical amplifiers. Fibers can be doped with other ions that can laser such as praseodymium ($Pr^{+3}$). Praseodymium ($Pr^{+3}$) ASE sources produce an ASE spectrum in the 1300 nm window. The spectral width of an ASE source is governed by the emission properties of the dopant, and the optical power level is governed by the dopant concentration, the power of the pumping source, and any internal losses in the ASE system. For the $ER^{+3}$ case, the spectral width is ~30 nm and the power levels can be in the range of 10's of milliwatts.

Although shown as a separate module, in some embodiments the source 3 and module 5 may be combined in a common module and/or on a single optical circuit board. If kept separate, they may be located within a common housing or housed separately. The input port 7 may be a physical port that is not an output port of the source 3 or the circulator 13, or may be an output port of the source 3 or an input port of the circulator 13.

The output port 9 of the module 5 may be a physical port that is coupled via a fiber or other waveguide to a separate output port of the MWO 1 or to an input port of another module within the MWO 1, may be a physical port that functions as both the output port of the module 5 and the MWO 1, or may be an input port to a device coupled to the MWO 1. Similarly, the output port 11 of the module 5 may be a physical port that is coupled via a fiber or other waveguide to a separate output port of the MWO 1 or to an input port of another module within the MWO 1, may be a physical port that functions as both the output port of the module 5 and the MWO 1, or may be an input port to a device coupled to the MWO 1.

The circulator 3 may be any apparatus that properly routes signals within the MWO 1. However, it is contemplated that in some instances the circulator 13 will be a three port device with a cyclic input output function. In such instances signals input on a first port are output on a second port, signals input on a second port are output on a third port, and signals input on a third port are output on a first port (1st port ->2nd port, 2nd port ->3rd port, 3rd port ->1 st port). The preferred circulator will be a polarization insensitive device. This implies that regardless of the polarization state of light injected into the circulator the performance, and hence the optical output from the circulator, is undifferentiated from the input (with the exception of the optical power loss due to the insertion loss of the circulator). Preferred performance requirements for this device are port-to-port insertion loss less than or equal to 1.0 dB over the optical bandwidth of interest, channel isolation of greater than or equal to 50 dB (2nd port ->1st port, 3rd port ->2nd port), a directivity value of greater than or equal to 50 dB (1st port ->3rd port), and/or a total return loss of greater than or equal to 50 dB. Additionally, the total optical power handling capability is preferred to be greater than or equal to 500 milliwatts. The optical bandwidth of the circulator is preferred to span the minimum to the maximum wavelengths to be sliced from the broadband spectrum.

The set 15 of n Bragg gratings 17 are preferably a set of fiber Bragg gratings (FBGs) formed on a common optical fiber coupling a second port of the circulator 13 to the second output port 11. However, it is contemplated that in alternative embodiments the set 15 of n Bragg gratings 17 may be provided by some other mechanism, and/or may be replaced with a plurality of notch filters that are not Bragg gratings. Alternative approaches to the FBGs include multiple-layer stack narrow band optical filters as well as using Fabry-perot filters with reflectors.

As indicated by the "n" used in the text and figures, the actual number of FBGs or other frequency slicing mechanisms can vary between embodiments. In some instances a source may have as few as 2 (i.e. n=2) FBGs and/or other slicing mechanisms, and may comprise 10s, 100s, or even more FBGs and/or other slicing mechanisms. However, it is contemplated that MWOs comprising between 3 and 100 FBGs and/or other slicing mechanisms will have widespread application.

The MWO 1 of FIG. 1 functions by having the source 3 produce a broadband optical signal, in some instances several 10s of nanometers in width. The signal enters the first port of the three port circulator 13, and is routed to the second port of the circulator 13 where it exits the circulator. After exiting the second port, portions of the signal are reflected back into the second port of the circulator with such reflected portions exiting the MWO 1 through the port 9, and the non-reflected portions continuing on to exit the MWO 1 through the port 11. If the Bragg gratings 17 are each adapted to reflect back a specific wavelength, the reflected portions will comprise the wavelengths corresponding to the wavelengths reflected by the Bragg gratings.

Figure 2:
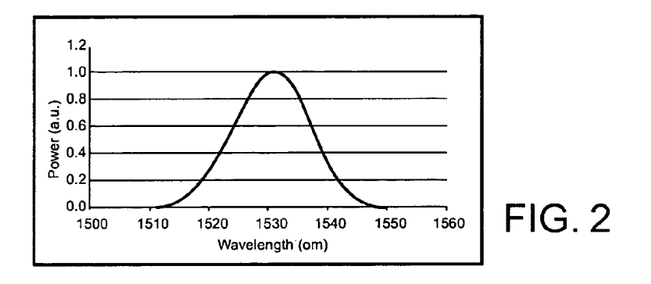
FIG. 2 is a plot of an input signal in accordance with an exemplary embodiment of the invention.
Figure 3:
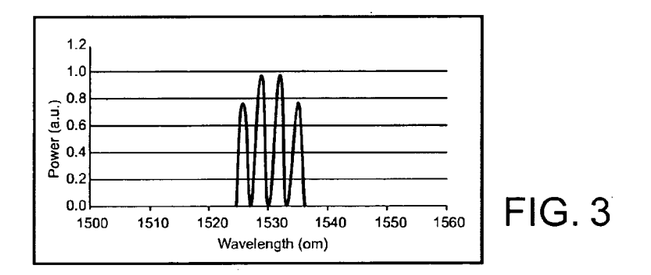
FIG. 3 is a plot of a first output signal in accordance with an exemplary embodiment of the invention.
Figure 4:
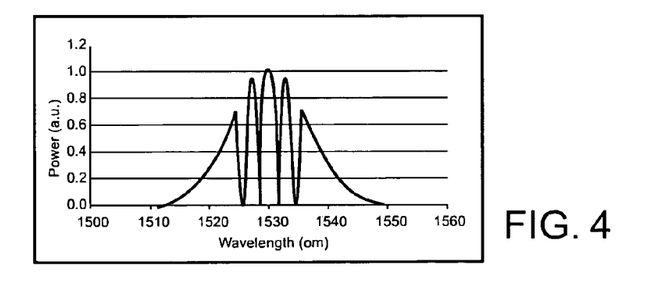
FIG. 4 is a plot of a second output signal in accordance with an exemplary embodiment of the invention

FIGS. 2-4 depict the effects of the modification module 5 (assuming that n=4 for illustration purposes) on a signal input via the input port 7. As can be seen the input signal shown in FIG. 2 is "notched" or "sliced" by the set 15 of n Bragg gratings 17, with the sliced out portions exiting the module and the source via the first output port 9, and the remaining portions exiting the module and the source via the second output port 11. As can be seen in FIG. 3, the reflected portions correspond to four specific wavelengths that are the wavelengths of the Bragg gratings 17. The signal shown in FIG. 3 comprises frequency separated frequency slices with the slices being the reflected portions of the broadband signal. The signal shown in FIG. 4 also comprises frequency separated frequency slices with the slices being the non-reflected portions of the broadband signal. The slices of the signal of FIG. 3 correspond to the frequency gaps separating the slices of the signal of FIG. 4. Similarly, the slices of the signal of FIG. 4 correspond to the frequency gaps separating the slices of the signal of FIG. 3.

Figure 5:
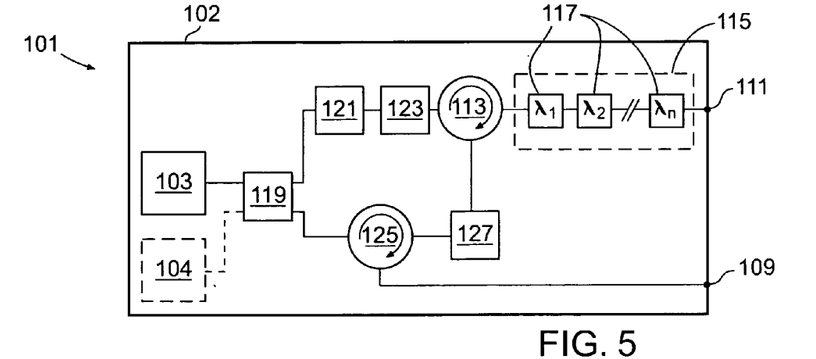
FIG. 5 is a schematic view of a second multi-wavelength optical source in accordance with an exemplary embodiment of the invention.

In FIG. 5, a second exemplary MWO 101 includes a housing 102, an optical pump source 103, a first output port 109, and a second output port 111. The MWO 101 also includes an optical splitter 119, a first length of doped optical fiber 121 as a source of ASE, an isolator 123, a first circulator 113, a set 115 of n Bragg gratings 117, a second length of doped optical fiber 127 for the amplification of signals, and a second circulator 125. The first length of doped fiber 121, the optical isolator 123, the optical pump source 103, and the optical splitter 119 form an ASE stage. The optical pump source 103, the optical splitter 119, the optical circulator 125, and the second doped fiber 127 form an amplifier stage. The optical pump source 103 and the optical splitter 119 are shared assets between the ASE stage and amplifier stage.

The MWO 101 is similar to the MWO 1 in that it also has a set 115 of n gratings 117, and produces one output that is the output of a light source with portions sliced out, and another output that includes the sliced out portions. However, the MWO 101 differs from MWO 1 in a couple of ways It differs in one regard in that the generation of the broadband signal (or ASE) is integral to the structure of MWO 101. Additionally, the MWO 101 includes an integrated optical amplification stage. Assets are shared between the ASE and amplifier stage to make better use of space in the package design as well as reduce cost of the overall optical source. The MWO 101 also differs from MWO 1 in that the sliced portions are amplified prior to exiting the MWO 101 via the output port 109.

The splitter 119 may comprise any mechanism for splitting a signal output by the pump source 103 between the first doped fiber 121 and the circulator 125. Moreover, it may split the signal equally, or unequally between the first doped fiber 121 and the circulator 125. In some instances the splitter 119 be may be a three (or four) port optical fiber device, with a first port being used as the optical input and second and third ports being used as outputs. The fourth port, if available, is generally not used and is terminated to eliminate any back reflections into the system that will cause optical instability. In specific applications where high reliability in the MWOs is required a second pump source 104 is attached to the fourth port. The pump 104 can be placed in a standby mode so that, should the primary pump 103 fail, the second pump 104 can be brought online to prevent or minimize any disruption in service. The forth port and second pump 104 source can also be utilized on a load sharing basis. In such an instance, both pump sources 103 and 104 are run at the same time but at 50% power level, therefore sharing the load. In some instances, the pump sources 103 and 104 may provide different levels of power (i.e. 10% and 90%, 25% and 75%, etc.). Should a failure occur in one of the pumps 103 and 104, the remaining active unit 103 or 104 can be brought to full power level to compensate for the loss of the other pump 103 or 104. Whether used for load balancing or as a backup source, in both instances the inclusion of the second pump source 104 adds a higher level of reliability to the MWO 101, allowing for no disruption in service as well as none disruptive repair of the failed pump source.

For many applications a 3 dB (50/50) splitter will be used as the splitter 119 to split the power equally from the pump source 103. However, other split ratios are available so the output performance of the ASE and amplifier can be adjusted. It is also preferred that the splitter 119 have one or more of the following characteristics: (a) return loss greater than or equal to 55 dB; (b) directivity greater than or equal to 55 dB; and (c) error in coupling ratio plus or minus 5%. The center of the optical bandpass for the coupler should align with the pump source wavelength to be used. For example $Er^{+3}$-doped fiber is typically pumped at either 980 nm or 1480 nm. This would require that the optical splitter's bandpass align with one of the two available pumping wavelengths. Obviously, a 980 nm pumped system would not be optimally paired with a splitter whose bandpass is at 1480 nm and vice a versa. Total optical power handling for the splitter 119 is preferably greater than 500 milliwatts.

The doped fibers are preferably fiber doped with ions that will be excited by the source 103. However, alternative embodiments may replace one or both of the doped fibers 121 and 127 with an alternative ASE source or amplifier.

Although the source 103 may be any of a variety of sources it is contemplated that a pump laser may be advantageously used. Such a pump laser would act as a source of excitation energy, and would preferably have a pumping wavelength that is within the desired energy absorption transition for the doping ion(s). The resulting excitation transition caused by the pumping wavelength should cause an emission transition at the desired wavelengths to be amplified or produce and ASE fluorescence. For the example using $Er^{+3}$-doped fiber, both 980 m and 1480 m pump sources have been successfully used to generate an excitation transition that produces an ASE spectrum and signal amplification centered near 1550 nm. The optical output requirements for these pump sources can vary, but are preferably from 30 milliwatts to greater than or equal to 200 milliwatts, with the output requirement being dependent on the specific requirements of the ASE source and amplifier. The pump source 103 can be of the cooled or uncooled variety with the cooled type being preferred for use in non-thermally regulated environments.

It is also preferred that the pump source 103 be provided with a means of monitoring the optical pump power that is produced by the source. This can be accomplished via an internal monitor photodiode that is packaged as part of the pump source. The signal output from the monitor photodiode can be used to control the pump source as well as monitor its state of health, and predict eminent failure and end-of-life.

The circulators 113 and 125 may be any apparatus that properly route signals within the MWO 101. However, it is contemplated that in some instances the circulators 113 and 125 will have the characteristics described in regard to the circulator 3 of MWO 1 of FIG. 1.

The set 115 of n Bragg gratings 117 are preferably a set of fiber Bragg gratings formed on a common optical fiber coupling a second port of the circulator 113 to the second output port 111. However, it is contemplated that in alternative embodiments the set 115 of n Bragg gratings 117 may be provided by some other mechanism, and/or may be replaced with a plurality of notch filters that are not Bragg gratings. Alternative approaches to the FBGs include multiple-layer stack narrow band optical filters as well as a using Fabry-Perot filters with reflectors.

Figure 6:
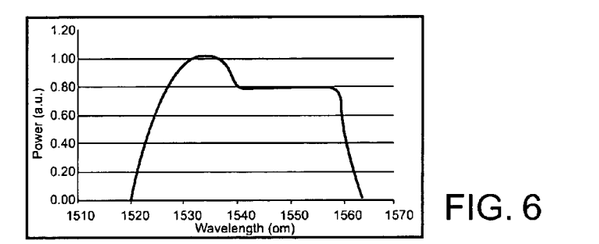
FIG. 6 is a plot of an input signal in accordance with an exemplary embodiment of the invention.
Figure 7:
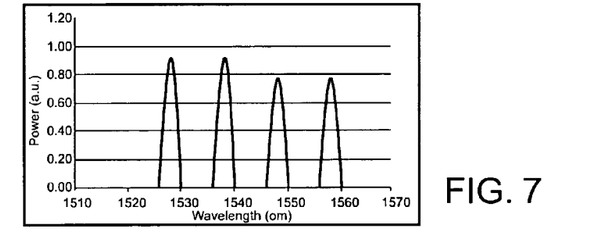
FIG. 7 is a plot of a first output signal in accordance with an exemplary embodiment of the invention.
Figure 8:
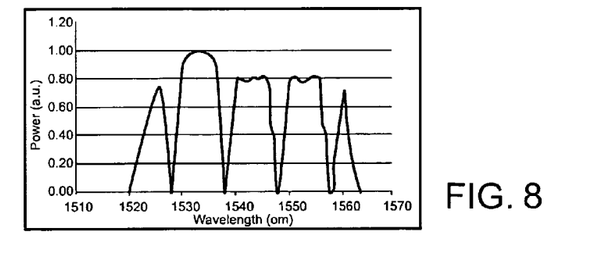
FIG. 8 is a plot of a second output signal in accordance with an exemplary embodiment of the invention.

FIGS. 6-8 depict the effects of the set 115 of n fiber Bragg gratings 117 on a signal output by the source 103 after it passes through the ASE stage and exits the isolator 123. As can be seen the signal shown in FIG. 6 is sliced by the set 115 of n Bragg gratings 117 (n=4 for illustration purposes), with the sliced out portions (see FIG. 7) exiting the module via the first output port 109, and the remaining portions (see FIG. 8) exiting the module via the second output port 111.

FIGS. 9-13 provide examples of alternative exemplary MWO embodiments.

Figure 9:
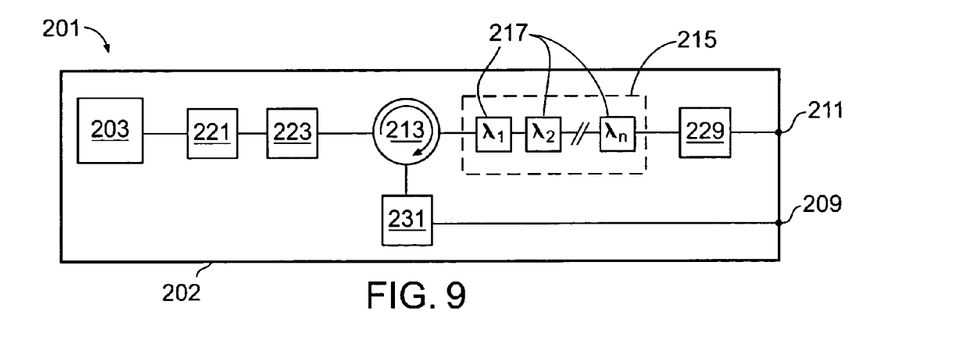
FIG. 9 is a schematic view of a third multi-wavelength optical source in accordance with an exemplary embodiment of the invention.

In FIG. 9, a MWO 201 uses a pumped doped fiber 221 excited by a pump laser 203 as an ASE source, and semiconductor optical amplifiers (SOAs) 229 and 231 on the two outputs 211 and 209 for amplification of the signals on the outputs 209 and 211. The MWO 201 also includes a housing 202, an optical isolator 223, a circulator 213, and a set 215 of n fiber Bragg gratings 217.

Figure 10:
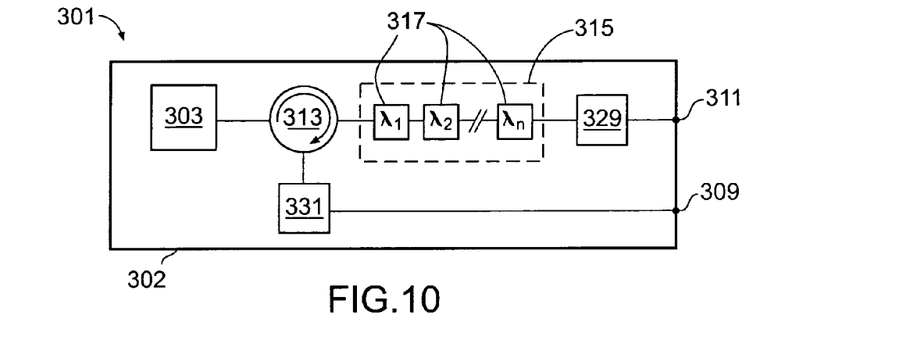
FIG. 10 is a schematic view of a fourth optical source in accordance with an exemplary embodiment of the invention.

In FIG. 10, a MWO 301 is similar to the MWO 201 of FIG. 9. However, the MWO 301 replaces the doped fiber ASE source of MWO 201 with a broadband SLD 303. The MOW 301 also includes a housing 302, a circulator 313, SOAs 329 and 331, outputs 309 and 311, and a set 315 of n fiber Bragg gratings 317.

Figure 11:
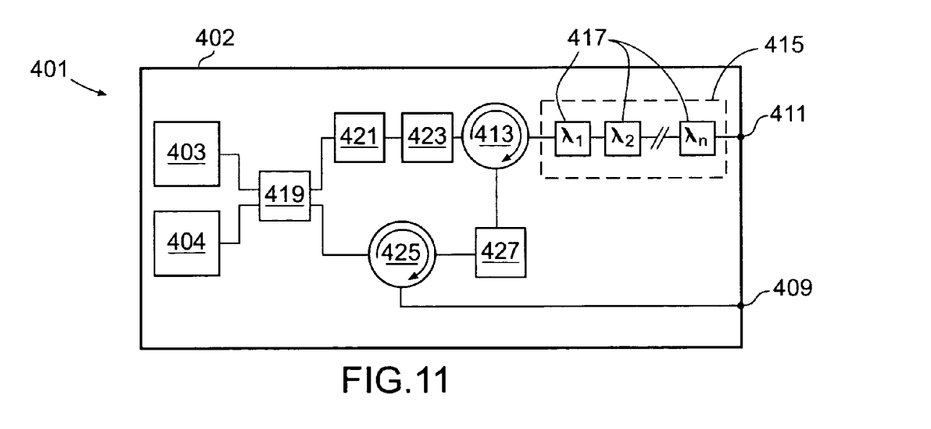
FIG. 11 is a schematic view of a fifth multi-wavelength optical source in accordance with an exemplary embodiment of the invention.

In FIG. 11, a MWO 401 illustrates that redundant pumps 403 and 404 can be used for increased reliability in an MWO such as the MWO 101 of FIG. 5. The MWO 401 of FIG. 11 includes a housing 402, an optical pump sources 403 and 404, a first output port 409, and a second output port 411. The MWO 401 also includes an optical splitter 419, a first length of doped optical fiber 421 as a source of ASE, an isolator 423, a first circulator 413, a set 415 of n Bragg gratings 417, a second length of doped optical fiber 427 for the amplification of signals, and a second circulator 425. The first length of doped fiber 421, the optical isolator 423, the optical pump sources 403 and 404, and the optical splitter 419 form an ASE stage. The optical pump sources 403 and 404, the optical splitter 419, the optical circulator 425, and the second doped fiber 427 form an amplifier stage. The optical pump sources 403 and 404 and the optical splitter 419 are shared assets between the ASE stage and amplifier stage. It should be noted that the redundant pump configuration of MWO 401 can be included in other MWOs, particularly MWO 501 of FIG. 12 and MWO 601 of FIG. 13.

Figure 12:
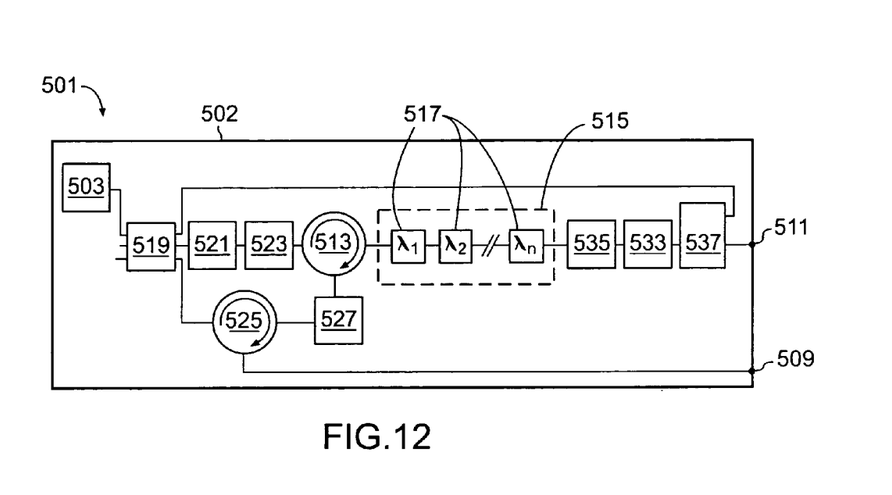
FIG. 12 is a schematic view of a sixth multi-wavelength optical source in accordance with an exemplary embodiment of the invention.

In FIG. 12, the MWO 501 uses a 3×3 optical splitter 519 to perform initial routing of a signal output by a light source 503, with one portion being sliced to provide two output signals as with the other MWOs described herein, and the other two portions being used to excite doped fibers 527 and 533 to amplify the two output signals. As shown in FIG. 12, the MWO 501 includes a housing 502, a doped optical fiber 521 and an isolator 523 that interact with the source 503 to function as an ASE source providing an input signal into a first port of the circulator 513. That signal is routed to a set 515 of n Bragg gratings 517 with a portion of the signal being reflected to contribute to the signal output at port 509 after being amplified as it passes through the doped fiber 527, and another portion being passed through to contribute to the output at port 511 after being amplified as it passes through a doped fiber 533 (after passing through an isolator 535) and then out the port 511 via a wavelength division multiplexer (WDM) coupler 537. The second portion of the signal from the source 503 that is split off by the 3×3 splitter 519 is routed by the WDM coupler 537 to the doped fiber 533. The third portion of the signal from the source 503 that is split off by the 3×3 splitter is routed by the circulator 525 to the doped fiber 527.

Figure 13:
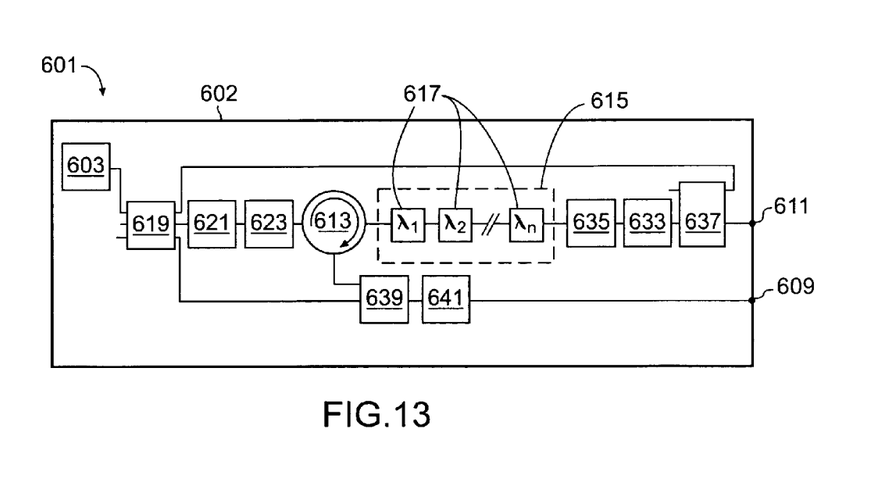
FIG. 13 is a schematic view of a seventh multi-wavelength optical source in accordance with an exemplary embodiment of the invention.

In FIG. 13, a MWO 601 is similar to the MWO 501, but has the circulator 525 of the MWO 501 replaced by a WDM coupler 639, and has a doped fiber 641 positioned between the WDM coupler 639 and the output 609 rather than between the WDM coupler 639 and a circulator 613. It should be noted that the amplifier stages can be configured as either forward or reverse pumped. The MWO 601 also includes a housing 602, a 3×3 splitter 619, a doped fiber 621, an isolator 623, a set 615 of Bragg gratings 617, and a WDM coupler 637. As with the MWO 501 of FIG. 12, the MWO 601 of FIG. 13 includes doped fibers 641 and 633 that amplify signals output on ports 609 and 611 with excitation for the doped fibers 641 and 633 being provided by the source 603.

Figure 14:
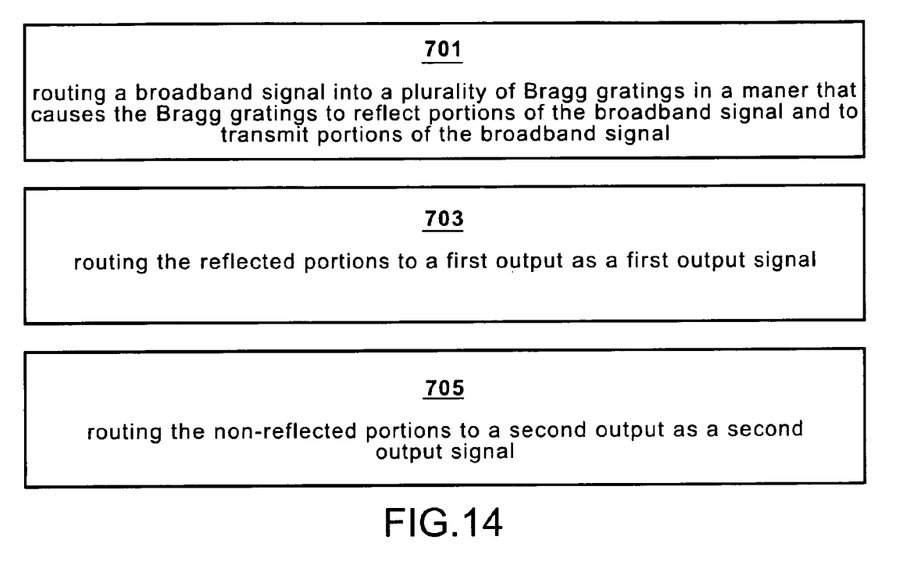
FIG. 14 is a schematic view of a method in accordance with an exemplary embodiment of the invention.

From the forgoing, it should be clear that the apparatus described herein are suitable for use in a method of providing a pair of related multi-wavelength signals from one or more broadband sources comprising, as shown in FIG. 14, the following: step 701, routing a broadband signal into a plurality of Bragg gratings in a manner that causes the Bragg gratings to reflect portions of the broadband signal and to transmit portions of the broadband signal; step 703, routing the reflected portions to a first output as a first output signal; and step 705, routing the non-reflected portions to a second output as a second output signal. In some instances, such a method may also involve using a super luminescent diode or an ASE source (using a pump laser and doped fiber) to provide the broadband signal, and using a three port circulator to route the broadband signal to the fiber Bragg gratings, and to route the reflected portions of the broadband signal to the first output. In some instances such a method may also involve using a pump laser to provide the excitation energy to a doped fiber so as to produce a broadband signal, and to provide an excitation signal used to amplify the first output signal and/or to provide an excitation signal used to amplify the second output signal. In some instances such a method may also involve using an SLD or ASE source to produce a broadband signal, and a semiconductor optical amplifier (SOA) as a means to amplify the output signal.

The MWOs described herein have particular application to sensing and telecommunications. For some sensing applications, there exists the need to increase the number of sensors available for detection without increasing the number of telemetry fibers or the number of optical sources required. With the ability to take a modestly broad optical spectrum from a single source and partition (slice) out wavelengths, the requirement of increasing the number of wavelengths available without increasing the number of sources has been meet. Depending upon the configuration, an 8:1 improvement should be achievable. This implies that for 8 wavelengths required only one multi-wavelength optical source is required. Having the multiple wavelengths available also allows for wavelength division multiplexing to be utilized over existing fiber telemetry, therefore allowing for an increase in the number of sensors without increasing the number of telemetry lines. Similarly, a multi-wavelength optical source can be used in the data- and telecommunications industry. Reducing the number of signal sources required is of importance to many equipment manufactures and end users, as it enables them to minimize equipment rack space requirements. Here the MWO would be integrated into an equipment rack and the wavelengths partitioned for use by application or customer type.

Another area of use for the MWOs described herein is in laboratory and test equipment. Testing of some optical components, sub-assemblies, and assemblies requires many test hours, tying up expensive resources. The use of a MWO as described herein will again aid the user in reducing the number of optical sources required to perform tests.

In some instances the sources described herein may comprising a housing that houses both the source and a modification module comprising the fiber Bragg gratings or other slicing mechanisms. In other instances, the sources may be housed separately from the modification modules. Although housings will likely vary between embodiments, housing having the following characteristics may be advantageously used in some instances. The housing package will provide a means for the output of the optical signal via optical connector(s). Additionally connections for the input and output of electrical control signals can be provided. Display indicators can be used to show the on/off status as well as to indicate normal function as well as alarm fault of the device. Electrical inputs could include power inputs to energize the device, as well as control inputs for the powering on and off the device. Control signals can also be used for the setting and control of any thermal electric coolers that may be used. Additionally, alarm and status signals that are generated internal to the unit, such as over temperature, over current, source end of life, etc. can be available for interface with external hardware.

What is claimed is:

1. A multi-wavelength optical source (MWO) comprising:
   a broadband optical source providing light that is split into a broadband optical signal, a first excitation signal, and a second excitation signal;
   a modification module having a first and second output, optically coupled to receive the broadband optical signal, the modification module splitting the broadband optical signal into a first output signal containing a plurality of frequency slices and a second output signal containing a plurality of frequency slices, separated in frequency from the plurality of frequency slices in the first output signal;
   the first excitation signal being guided to a doped fiber that is a waveguide of the first output signal; and
   the second excitation signal being guided to a doped fiber that is a waveguide of the second output signal.

2. The MWO of claim 1 wherein at least one of the frequency slices of the first output signal is narrower than a frequency slice of the second output signal.

3. The MWO of claim 2 wherein at least one of the frequency slices of the first output signal is narrower than all of the frequency slices of the second output signal.

4. The MWO of claim 3 wherein each of the frequency slices of the first output signal is narrower than all of the frequency slices of the second output signal.

5. The MWO of claim 1 wherein the first output signal and second output signal comprise substantially all the energy of the broadband optical signal such that adding the first output signal and second output signal would substantially reproduce the broadband optical signal.

6. The MWO of claim 1 wherein the broadband optical source consists essentially of frequency components having wavelengths between 1510 and 1570 nanometers.

7. The MWO of claim 1 wherein the optical source comprises a super luminescent diode.

8. The MWO of claim 1 wherein the optical source comprises an optical fiber based amplified spontaneous emission source.

9. The MWO of claim 1, wherein the optical source is a pump laser, and wherein the modification module comprises:
   an optical splitter having a first and second output and coupled to an optical output of the pump laser;
   a first doped fiber coupled to the first output of the splitter;
   a first circulator having a first, second and third port, the first port coupled to the first doped fiber;
   a second circulator having a first, second and third port, the first port coupled to the second output of the splitter;
   a second doped fiber coupled between the third port of the first circulator and the second port of the second circulator;
   the third port of the second circulator coupled to the first output; and
   a plurality of fiber Bragg gratings optically positioned between the second port of the first circulator and the second output of the MWO.

10. The MWO of claim 9 further comprising a second pump laser having an optical output coupled to the splitter.

11. The MWO of claim 1 further comprising:
a splitter optically coupled to an output of the broadband optical source to split light from the broadband optical source into the broadband optical signal, the first excitation signal, and the second excitation signal;
a first doped fiber optically positioned between the splitter and a first port of a circulator;
a second doped fiber optically coupled to a first wavelength division multiplexer coupler (WDM) where the second splitter is optically coupled to the first WDM such that it receives the second excitation signal;
a plurality of fiber Bragg gratings optically positioned between a second port of the circulator and the second doped fiber; and
a second WDM coupler optically coupled to the splitter, a third port of the circulator, and a second doped fiber.

12. A method of providing a pair of related multi-wavelength signals using one or more broadband sources comprising;

using a pump laser or a super luminescent diode to provide a broadband signal;

using a three port circulator to route the broadband signal into a plurality of Bragg gratings in a manner that causes the Bragg gratings to reflect portions of the broadband signal and to transmit portions of the broadband signal;

routing the reflected portions to a first output as a first output signal;

routing the non-reflected portions to a second output as a second output signal; and using the pump laser or super luminescent diode to provide a first excitation signal for amplifying the first output signal and to provide a second excitation signal for amplifying the second output signal.

* * * * *